(12) United States Patent
Goertzen

(10) Patent No.: US 6,928,191 B2
(45) Date of Patent: *Aug. 9, 2005

(54) APPARATUS AND METHOD FOR IMPROVED INTERLACE PROCESSING

(75) Inventor: Kenbe D. Goertzen, Topeka, KS (US)

(73) Assignee: QuVIS, Inc., Topeka, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/139,532

(22) Filed: May 6, 2002

(65) Prior Publication Data

US 2003/0021483 A1 Jan. 30, 2003

Related U.S. Application Data

(63) Continuation of application No. 09/943,454, filed on Aug. 30, 2001, now abandoned, which is a continuation of application No. 09/696,757, filed on Oct. 25, 2000, now Pat. No. 6,289,132, which is a continuation-in-part of application No. 09/023,636, filed on Feb. 13, 1998, now abandoned.

(51) Int. Cl.⁷ .............................................. G06K 9/36
(52) U.S. Cl. ........................................ 382/240; 382/236
(58) Field of Search ................................ 382/232, 233, 382/236, 238, 240, 248; 348/395.1, 397.1, 398.1, 408.1, 437.1, 438.1, 441, 446, 448, 403.1, 469, 555; 375/240.1, 240.18, 240.19, 240.25, 240.26, 240.29, 240.11

(56) References Cited

U.S. PATENT DOCUMENTS

| | | | | | |
|---|---|---|---|---|---|
| 4,751,742 | A | * | 6/1988 | Meeker | 382/240 |
| 5,436,663 | A | * | 7/1995 | Guede | 348/400.1 |
| 5,541,659 | A | * | 7/1996 | Kojima | 375/240.11 |
| 5,546,477 | A | * | 8/1996 | Knowles et al. | 382/242 |
| 5,602,589 | A | * | 2/1997 | Vishwanath et al. | 375/240.11 |
| 5,694,170 | A | * | 12/1997 | Tiwari et al. | 348/390.1 |
| 5,764,805 | A | * | 6/1998 | Martucci et al. | 382/238 |
| 6,272,253 | B1 | * | 8/2001 | Bannon et al. | 382/236 |
| 6,310,972 | B1 | * | 10/2001 | Li et al. | 382/232 |

* cited by examiner

*Primary Examiner*—Yon J. Couso
(74) *Attorney, Agent, or Firm*—Blomberg & Sunstein LLP (57) ABSTRACT

An interlaced image processing module and corresponding method facilitate improved processing of interlaced motion images. In one embodiment, the interlaced image processing module receives image data frames having interlaced first and second fields and produces a reference field and error field. The reference field corresponds to the still image content of the interlaced frame, whereas the error field corresponds to the motion content of the interlaced frame, particularly the motion between fields. Motion between fields is thus represented in the error field, without redundant representation of the still image content provided by the first field. Where there is little motion between fields, the error terms will be small so the predictor preserves the coding efficiency provided by any auto-correlation in the image.

41 Claims, 8 Drawing Sheets

APPARATUS AND METHOD FOR IMPROVED INTERLACE PROCESSING

CROSS-REFERENCE TO RELATED APPLICATIONS

This application is a continuation of our prior application Ser. No. 09/943,454, filed Aug. 30, 2001; now abandoned which, in turn is a continuation of application Ser. No. 09/696,757, filed Oct. 25, 2000; now U.S. Pat. No. 6,289,132, which in turn is a continuation-in-part of our prior application Ser. No. 09/023,636, filed Feb. 13, 1998, now abandoned. The disclosures of all three of these related applications are hereby incorporated herein by reference.

BACKGROUND OF THE INVENTION

1. Field of the Invention

This application relates generally to digital image signal processing, and more particularly to the compression of interlaced motion images.

2. Description of the Related Art

Image and motion image signals are increasingly being processed in the digital domain. One set of problems encountered in digital image signal processing result from signal formats used in conventional analog video processing. For example, certain formats, particularly conventional broadcast television, implement signal interlacing. In video interlacing, a frame is comprised of two separate rasters. A first raster comprises a series of lines in the frame, and a second raster comprises scan lines that reside between the lines from the first raster. The first and second rasters can respectively be referred to as first and second fields. Thus the video signal can be said to include a series of frames, with each frame including first and second interlaced fields.

There are various problems introduced by interlaced motion images and the conventional processing methods. For example, interlaced images may have relative motion between the rasters, which does not correlate well vertically. One solution to this could be to encode images with significant motion by frame. However, this would result in very inefficient encoding.

Alternatively, images can be processed by field to allow for poor vertical correlation in the case of motion. However, if this is done, the encoding advantage of any high correlation in still areas is lost, again resulting in inefficient encoding. Additionally, if images are processed by field, slight variations in DC errors or quantifier linearity will cause horizontal stripes in a motion free fame viewed as a still.

Typically, block based compression schemes (such as MJPEG and MPEG) treat the interlaced video decorrelation problem on a block level. Thus, each block in a frame is classified as a motion block or a still block. The still image blocks are processed differently from the motion blocks.

There are various problems with the block based approach. Particularly, block based motion analysis can generate boundaries and visual artifacts due to incorrect motion estimation decisions. Also, block based motion analysis can generate very large local errors, making it unsuitable for applications where local error bounds are desired, as in medical, technical or critical production applications. Finally, the block based approach can cause an obvious discontinuity or defect where an object in motion spans adjacent blocks, particularly where one block is still processed while an adjacent block is motion processed.

Thus, there remains a need for digital image signal processing, particularly processing incorporating lossy compression, that addresses the problems introduced by frames having interlaced fields.

SUMMARY OF THE INVENTION

The present invention provides an apparatus and method for optimized compression of motion images having frames with interlaced first and second fields which avoids the inefficiencies and inadequacies of conventional schemes, including block based approaches.

In one embodiment, the apparatus and method for interlaced motion image compression provides predicted image frames having a reference field and an error field from the interlaced motion image frames. The reference field can be one of the first and second fields in the interlaced frame. Thus, the reference field has the same values as, for example, the first field. The reference field provides the still image content of the frame, preferably on a value by value basis.

The error field provides the motion image content of the frame on a value by value basis. Specifically, for the values corresponding to each location in the prediction field, the error field provides a value corresponding to the motion between fields. The error field can be obtained by first obtaining a prediction field that provides what the non-reference field (e.g., the second field) would be if there were no motion between the first and second fields. Then the error field is determined using the difference between the second field and the prediction field.

The first and second fields are easily recovered from the predicted frame data. One of the fields (e.g., the first) is determined to be the reference field, which is part of the predicted image frames. The remaining field is obtained by summing the prediction and error fields, thus reversing the forward interlaced image processing steps.

In image processing, still content in a frame can be efficiently encoded, as it is highly correlated. The interlaced motion image compression scheme takes advantage of any and all coding efficiency provided by auto-correlation, because the values in the error field corresponding to still portions of the frame will be small. This is in marked contrast to the block based approach, which can often predict a block having substantial still portions to be a motion block and thus lose the coding benefit of the still portions.

The apparatus and method for interlaced image processing also solves various other problems present with conventional schemes. For example, the image is processed as a continuous function, and so avoids discontinuous artifacts, and alleviates problems related to motion between fields, since the reference field provides the still content for both fields, and the error field provides the relative motion between the fields.

Another embodiment of the apparatus and method for interlaced motion image compression receives frames having geometrically interlaced first and second fields and uses a vertical transform to produce frames having high and low frequency fields that each correspond to the first and second fields. Vertical transformation according to this embodiment groups lines together in time to provide good motion correlation. Additionally, the auto-correlation in the frame from still portions is taken advantage of through the reduced magnitude of high band components.

In further embodiments, wavelet transform techniques are used to process interlaced motion images, including by implementing vertical transformations using wavelet transforms. Particular wavelet embodiments use two-dimensional, nonseparable, wavelet techniques, including near orthogonal, odd-sized filter systems. Other particular wavelet embodiments use two-dimensional, biorthogonal filters; and spatial-only wavelet transforms. Embodiments are particularly useful for processing images that are a mixture of interlaced and progressive (non-interlaced) video.

The present invention has other advantages and features which will be more readily apparent from the following detailed description of the invention, in conjunction with the accompanying drawings.

DETAILED DESCRIPTION OF THE PREFERRED EMBODIMENT

Figure 1:
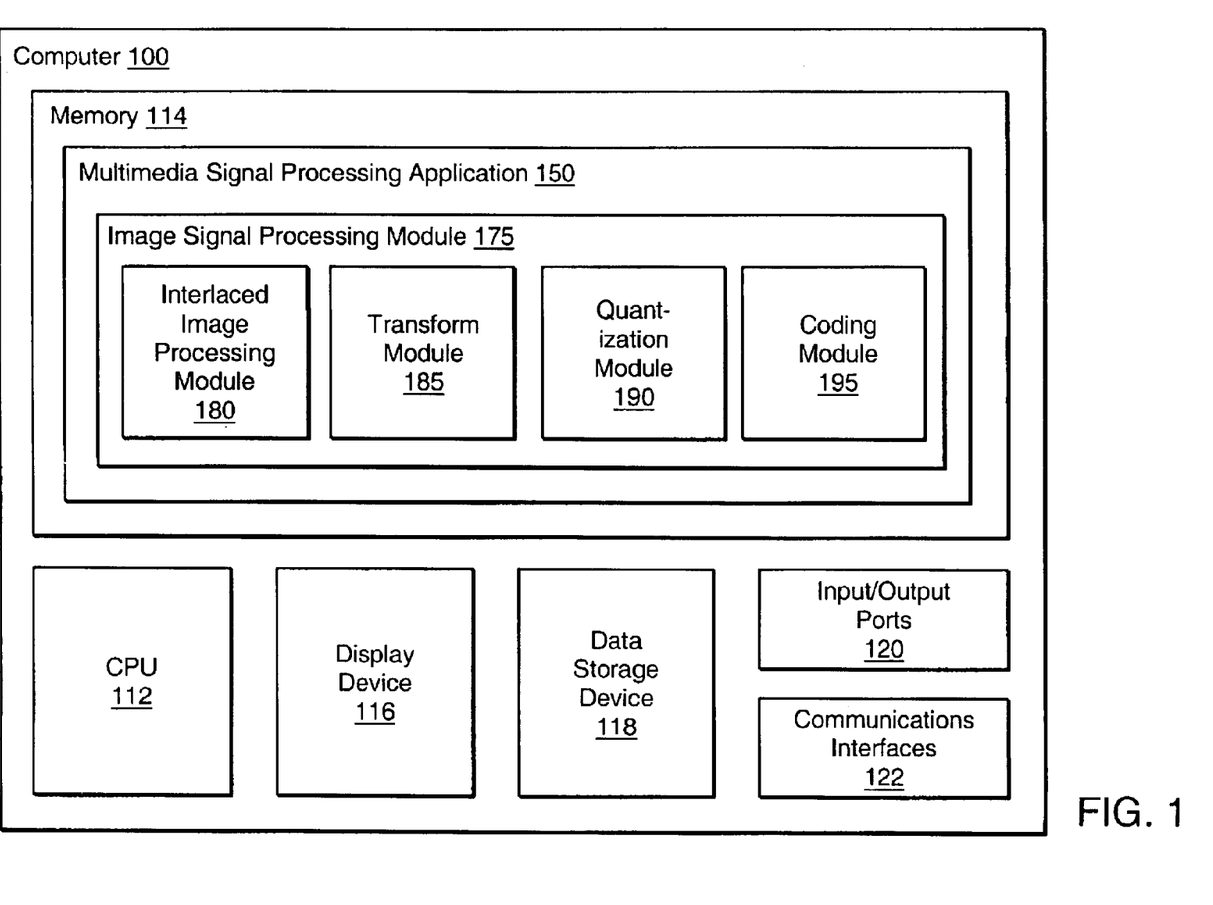
FIG. 1 is a schematic illustrating a computer including an embodiment of an interlaced image processing module for compressing interlaced motion images in accordance with the present invention.

Referring now to the block diagram of FIG. 1, a computer 100 incorporating an embodiment of an interlaced image processing module 180 constructed in accordance with the present invention is shown.

The computer 100 includes a CPU 112, memory 114, display device 116, data storage device 118, input/output ports 120 and communications interfaces 122. The CPU 112 is arranged to execute instructions, such as those stored in memory 114, which may be a conventional RAM or any conventional memory for storing instructions for execution by the CPU 112. The display device 116 is conventional, such as a CRT, LCD or LED type display. Various conventional hardware for storing data may be used for the data storage device 118, such as a hard disk, or a tape drive. The input-output ports 120 are also conventional, and can be arranged to input and output video signals, such as interlaced motion image signals (e.g., NTSC broadcast television format). Although it is understood that the computer may operate as a stand alone, the communications interfaces 122 allow the computer 100 to communicate with other computers on a local area network, other computers over the Internet, etc. Thus, the communications interfaces 122 can include a modem and/or network interface card for facilitating such communication.

The CPU 112, memory 114, display device 116, data storage device 118, input/output ports 120 and communications interfaces are arranged in a conventional computer architecture. The computer 100 can be a personal computer with an operating system and various applications, including the multimedia signal processing application 150. Alternatively, the computer 100 can be a dedicated video recorder, also including the functionality of the multimedia signal processing application 150, the image signal processing module 175 and its components, but not necessitating certain personal computer features. Various conventional architectures for predicting an interlaced motion image signal according to the functionality described herein will be recognized by the artisan.

The multimedia signal processing application 150 includes routines for processing audio and image signals. The application 150 includes an interlaced image processing module 180, a transform module 185, a quantization module 185, and a coding module 195. Although in this embodiment the application 150 is implemented as software, it is understood that the functionality of the application 150, including that of the various modules 180, 185, 190, 195, can be implemented in hardware, or a combination of hardware and software.

Figure 2:
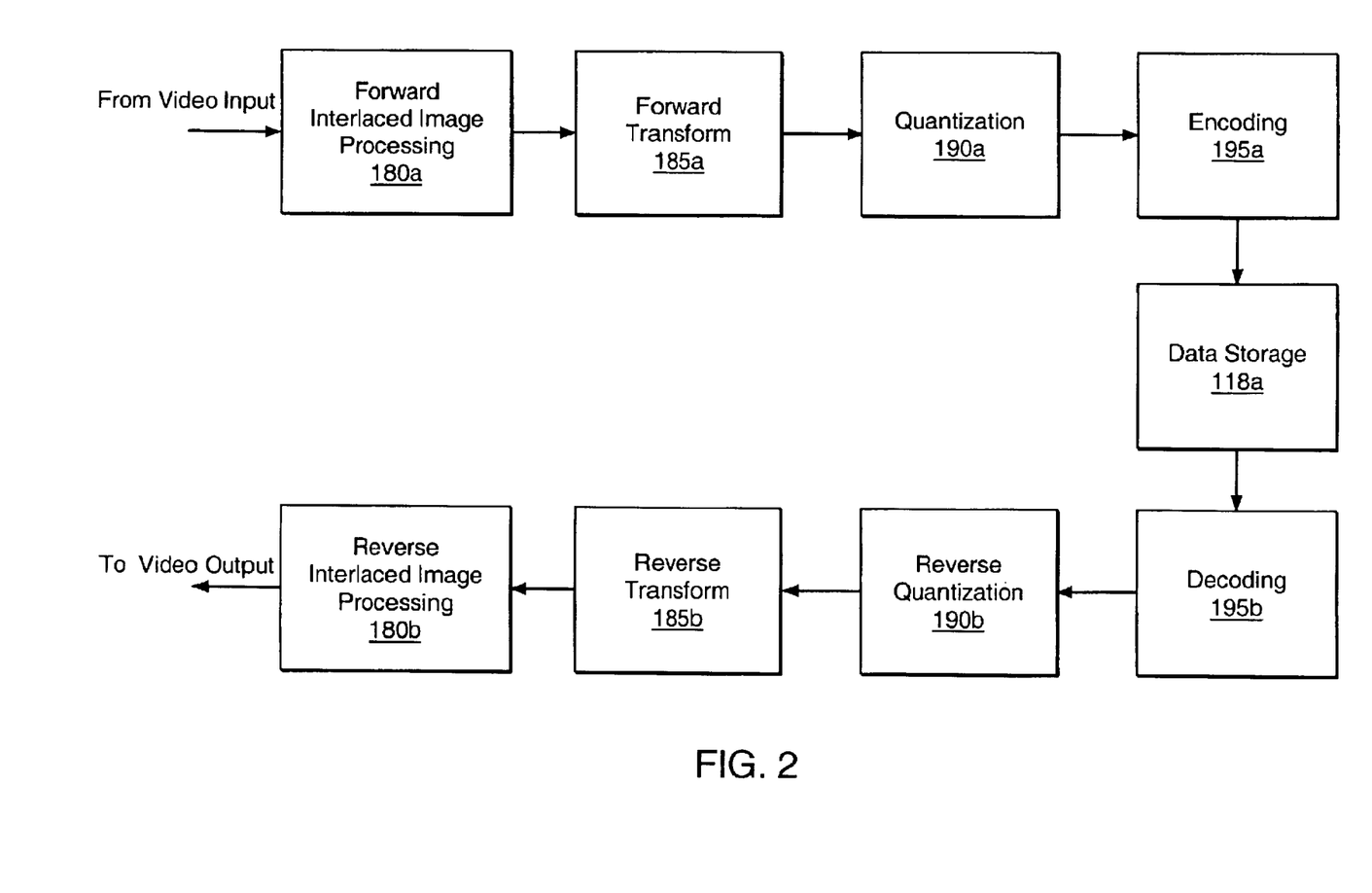
FIG. 2 is a flow diagram illustrating a method for processing video signals including an embodiment of a method for compressing interlaced images in accordance with the present invention.

Referring now to the flow diagram of FIG. 2 along with FIG. 1, a method of image signal processing performed by the image signal processing module 175 illustrates how a video signal can be input to, forward processed, stored (or transmitted in compressed form), reverse processed, and output from the computer 100. The flow diagram of FIG. 2 conceptually illustrates the flow of data and the operations performed on the data. The various modules 180, 185, 190, 195 in the image signal processing module 175 perform the operations, which are numbered accordingly. For example, the interlaced image processing module 180 performs the operations 180a, 180b shown in FIG. 2.

The signal originating from a video source (e.g. a conventional analog broadcast video signal), after some initial conventional processing, can be input to a frame buffer (not shown). The frame buffer temporarily stores frames of image data. Multiple frames can be stored in each buffer so that the data available for processing does not become exhausted when one module processes faster than another.

The frame buffers can be arranged as a conventional FIFO buffer, and can be provided in memory, or, alternatively, can be register based.

As shown in FIG. 2, the digital image signal is subjected to forward interlaced image processing 180a, then transformation 185a, quantization 185a, and encoding 190a. For forward interlaced image processing 180a, digital image data having frames including first and second fields are processed. In one embodiment, the second field is predicted using the first field as a reference, and forward interlaced image processing 180a produces frame data comprising the first field and an error field. In another embodiment, the first and second fields are used to produce low and high band information corresponding to each frame. The functionality of the interlaced image processing module 180 is described further below.

The transform module 185, quantization module 190 and coding module 195 implement conventional image processing techniques for the illustrated forward transform 185a, quantization 190a and encoding 195a operations. Basically, the forward transform 185a conditions the image data for further processing. Various conventional transforms can be used for the transform operation, such as a wavelet transform. The quantization operation 190a provides data values for the transformed image data according to the selected quantization scheme (e.g. 12-bit). The encoding operation 195a provides encoded image data which is compressed for more efficient storage, transmission, or other processing. Conventional encoding schemes for compressing the amount of data required to represent the quantized data, such as Huffman coding, can be implemented by the coding module 195.

It is understood that various alternatives for the forward transform 185a, quantization 190a, and encoding 195a operations will be available to the ordinarily skilled artisan. One such alternative for encoding is described in patent application Ser. No. 60/052,144, filed by Kenbe Goertzen on Jun. 9, 1997, entitled Apparatus and Method for Entropy Coding.

Various operations can be performed using the compressed image signal data produced by forward interlaced image processing 180a, transformation 185a, quantization 190a and encoding 195a. For example, the data can be stored 118a, for example, in a data storage device 118 such as a hard disk. Alternatively, the compressed image signal data can be transmitted from one point to another, such as from one computer to another over a LAN, a modem, or the Internet, or otherwise.

Finally, a reverse process to that described above where compressed digital image signal data is decoded 195b, reverse quantized 190b, reverse transformed 185b, and reverse interlaced image processed 180b to produce video output is also shown in FIG. 2.

FIGS. 1 and 2 illustrate an example of where the interlaced image processing module 180 and corresponding forward and reverse processing schemes could be implemented in image signal processing. Thus, the features associated with the interlaced image processing module 180 in the example, such as the quantization module 185, can be optionally excluded. For example, the computer 100 can include an interlaced image processing module 180 alone, such that interlaced image data subjected to forward processing may be provided to a conventional mechanism for processing such data, such as an image CODEC. The interlaced image processing module 180 and corresponding forward and reverse prediction processing methods are now further described.

Figure 3:
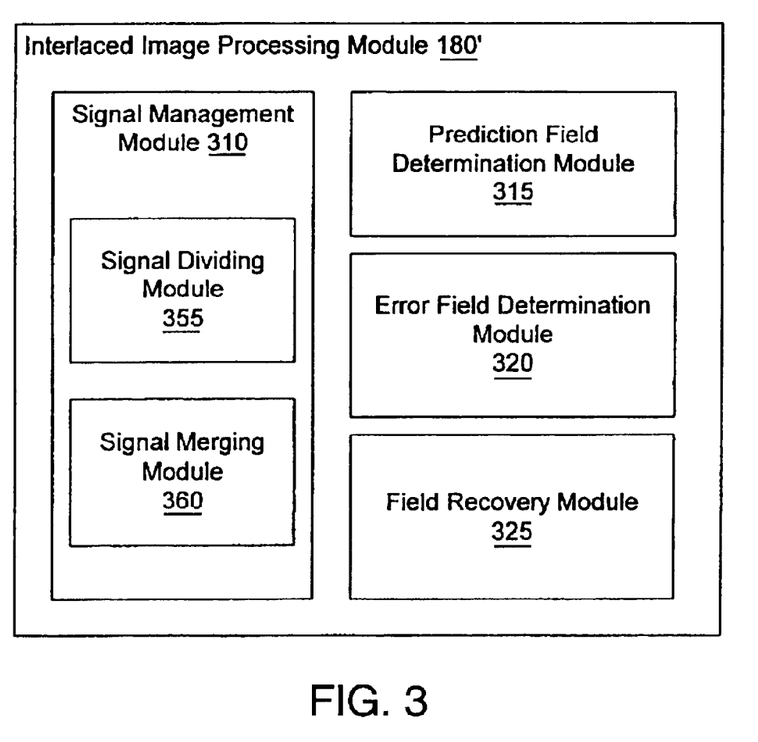
FIG. 3 is a schematic illustrating an embodiment of an interlaced image processing module constructed in accordance with the present invention.

Referring to the block diagram of FIG. 3, an embodiment of an interlaced image processing module 180' for providing the above described operations includes a signal management module 310, a prediction field determination module 315, an error field determination module 320, and a field recovery module 325. The signal management module 310 includes a signal dividing module 355 and a signal merging module 360.

Figure 4:
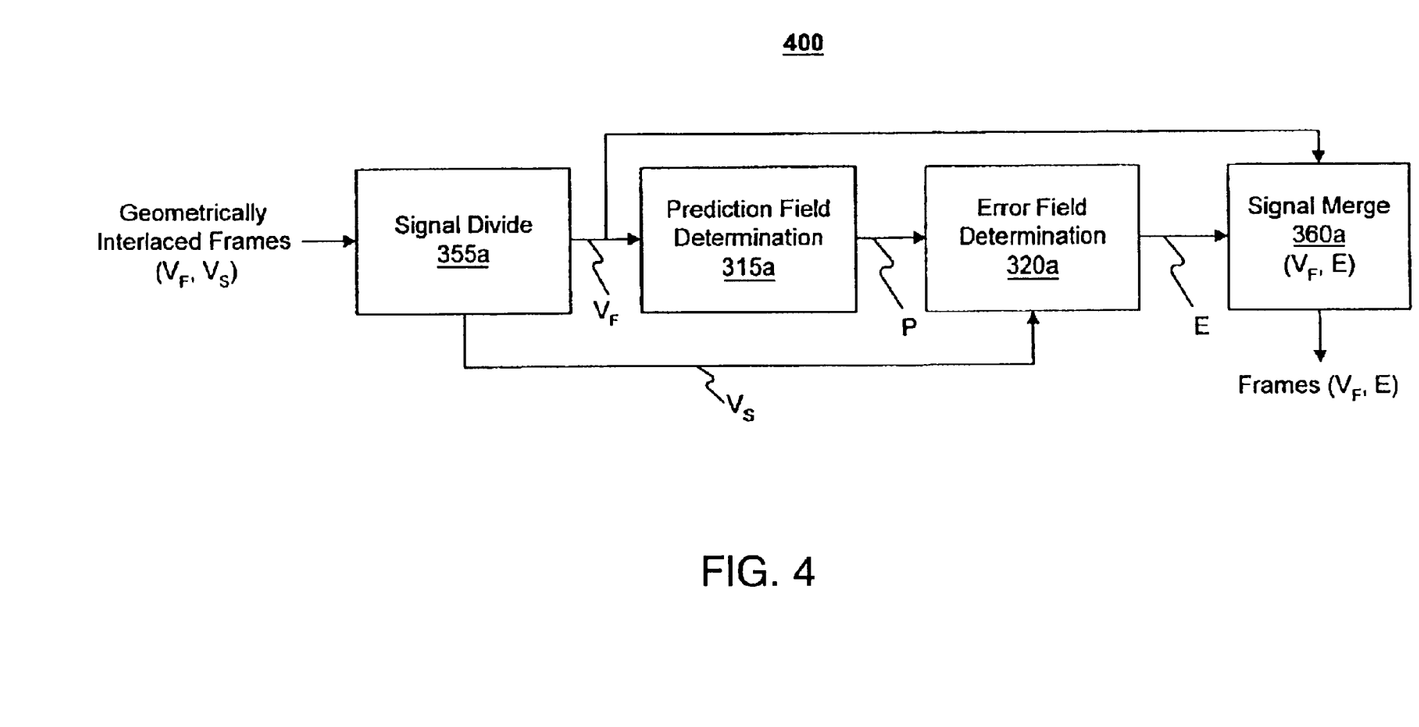
FIG. 4 is a flow diagram illustrating an embodiment of a method for forward processing of interlaced images in accordance with the present invention.

Referring now to the flow diagram of FIG. 4 along with FIG. 3, an embodiment of a method for forward processing of interlaced images 400 implemented by the interlaced image processing module 180' is described. The interlaced image processing module 180 receives geometrically interlaced frames. The interlaced frames include a first field ($V_F$). The interlaced image processing module 180 then produces non-interlaced frames comprising a reference field (e.g., $V_F$) and an error field (e.g. E). The reference field corresponds to the still image content of the predicted frame, whereas the error field corresponds to the motion content between fields.

First, the geometrically interlaced frame ($V_F$, $V_S$) is received by the signal divide module 355, which parses the signal (signal divide 155a) to produce the first field ($V_F$) and the second field ($V_S$). One of the fields is designated to be the reference field. In FIG. 4, the first field is shown as the reference field, but it is understood that the second field can alternatively be used as the reference field. The reference field is then used by the prediction field determination module 315 to produce a prediction field (FIG. 4, function block 315a). The prediction field is a determination of what the image data corresponding to the second field (or whatever field is not the reference field) would be if there were a substantial lack of motion between the first field and the second field. This provides a prediction field corresponding to the second field. The error field determination module 320 then produces an error field using the prediction field and the second field. Preferably, the difference between the second field and the prediction field is used to produce the error field. The signal merging module 360 then merges the first field and the error field to produce frames of predicted image data, which can also be referred to as frames of compressed image data. Preferably, the compressed image data frames are not interlaced in time. In other words, the values corresponding to the first field are temporally segregated from the values corresponding to the error field. In a sequential approach this would mean that for the compressed image data frame, a stream of first field values would first be encountered, followed by a stream of error field values (or vice-versa).

Since the prediction field corresponds to a second field that is assumed to have no motion, the error field thus, substantially correlates to the motion between frames, and provides such information very efficiently. Also, the reference field provides an efficient representation of the still image content in the image.

Figure 5:
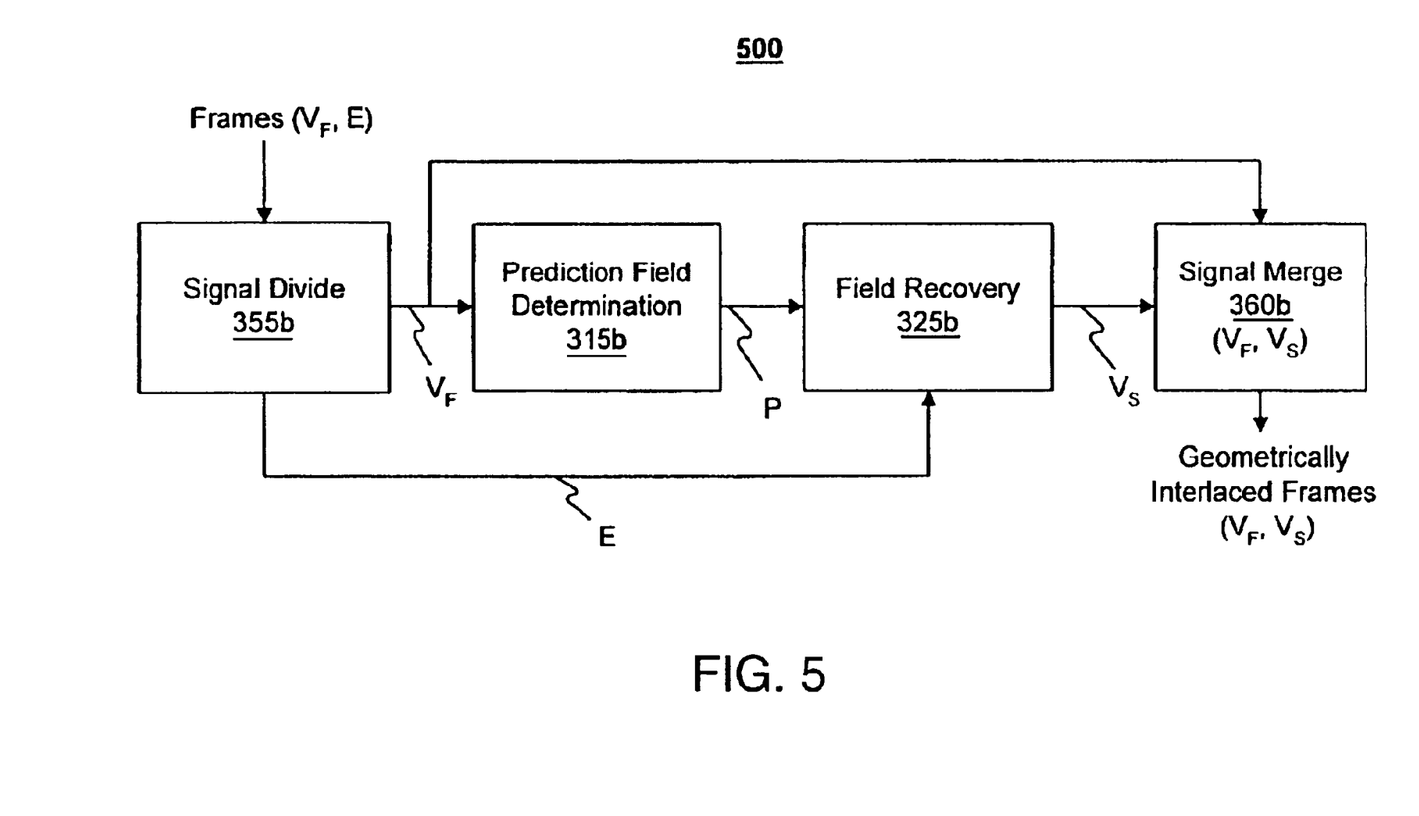
FIG. 5 is a flow diagram illustrating an embodiment of a method for reverse processing of interlaced images in accordance with the present invention.

Referring now to the flow diagram of FIG. 5, an embodiment of a method for reverse processing of interlaced images 500 implemented by the interlaced image processing module 180' is described. Previously produced predicted frame data can be provided to the signal divide module 355 for parsing into the first field and the error field. Then the prediction field determination module 315 produces a predicted field from the first field, preferably using the same functionality as used in the forward interlaced image processing scheme. The second field is then recovered by the field recovery module 325, preferably by adding the error field to the prediction field. Thus, the first field and the second field are provided, and can be conventionally merged by the signal merging module 360 to produce frames of interlaced first and second fields.

Table 1 is an exemplary illustration of the interlaced image processing scheme. Preferably, the interlaced image processing module 180 uses a transform which consists of a half band predictor to predict the second field from the first, and then generates the error terms between the prediction and the second field values as described above. The resulting frame data then consists of the initial field, followed by the second field represented as a prediction error. This transform has been found to provide apparent near perfect compensation and compression efficiency.

TABLE 1

| Frame Line | Original Data | Transformed Data | Line In Phase |
| --- | --- | --- | --- |
| 1 | 1111111111111111 | 1111111111111111 | 1 |
| 2 | 2222222222222222 | 1111111111111111 | 3 |
| 3 | 1111111111111111 | 1111111111111111 | 5 |
| 4 | 2222222222222222 | EEEEEEEEEEEEEEEE | 2 |
| 5 | 1111111111111111 | EEEEEEEEEEEEEEEE | 4 |
| 6 | 2222222222222222 | EEEEEEEEEEEEEEEE | 6 |

There are various advantages provided by the interlaced image processing module 180' and corresponding method of processing interlaced images. For example, the method can transform n bit data in an n bit system exactly. Additionally, the method is hardware efficient, in that it requires a minimum of processing logic and memory bandwidth to support it. The method is continuous, so it does not generate discontinuous artifacts, and it is very efficient because it does not group pixels, and thus, it avoids the potential for incorrect classification. Further, the method is interpolative and balanced (linear phase), so it does not produce the potential for vertical motion artifacts present in other methods. The method is very local, so it does not produce the potential for vertical ringing, tiling, smearing, or backward movement in time of information present in other methods. Finally, this method provides the added benefit of making it as easy to convert odd fields to even, or even fields to odd.

Additionally, various problems encountered with conventional interlaced motion image processing are alleviated. The problem of relative motion between the rasters is alleviated because frames with motion content between fields become areas of large prediction errors in the second (predicted) field, but the values are grouped so that they correlate well horizontally and vertically.

The low coding efficiency due to motion experienced using conventional techniques is prevented because highly correlated (largely still) images will produce a prediction field having small error terms, thus preserving the coding efficiency of highly correlated stills.

Further, the potential problems introduced in conventional field based processing, including those introduced by variations in DC error or quantifier linearity, are avoided because the second field is reconstructed using the low frequency information from the first field. This prevents any raster separation of field in a still frame. The error field effectively contains no low frequency information, so there is no frequency disagreement with the first field. This avoids horizontal stripes and localized interlaced separations in interlaced still information.

This approach also processes the entire image as a continuous function, so there is no possibility of discontinuous artifacts generated due to motion analysis decisions or decision regions. This further avoids the inefficiency resulting from grouping pixels, where any group which does not have exactly the same motion characteristics will not be optimally encoded. Also, with conventional approaches, small portions of images can present very large errors due to incorrect motion decisions, or regions which are not motion homogenous. Due to the continuous nature of this approach, large localized errors are completely avoided.

There are some additional subtle advantages to the prediction approach. One is the lack of "bounce" due to image artifacts moving in time. Sub-band transforms under heavy quantization cause a mixing of the first and second field information. This combination of temporal and spatial information causes the two fields to approach each other, which results in the appearance of slight field misplacement. One field appears to move slightly downwards and the other moves slightly upwards. This results in bouncy instead of linear vertical motion. Since the first field can remain unchanged (if it is the reference field), the prediction approach prevents artifacts from moving backward in time.

An additional benefit of this approach is that the interlaced image processing module can also be used to convert even fields to odd fields or odd fields to even. This can be done by converting the first field to a second field, and vice-versa, as follows. To convert the first field to a second field, the half band predictor is used to predict the second field as a $\pi/2$ vertical phase shift from the first field. To convert a second field line to a first field line, the half band predictor is used to predict a $\pi/2$ vertical phase shift in the error function, which is added to the first field line in that position.

As described above, a half band predictor is preferably used to predict the second field from the first field. The first and second fields can be represented in two dimensional geometrical space as $V_F(x, y)$ and $V_S(x, y)$, where y represents the row and x represents the column in a frame. If the first field pixels in the row above and below the second field pixel to be predicted are referred to as $V_F[x, -n \ldots n]$ where $V_F[x, -1]$ is just above and $V_F[x, 1]$ is just below the second field pixel to be predicted ($V_S[x, 0]$), then the following half band predictors can be used:

$$P[x, 0]:=(V_F[x, -1]V_F[x, 1])*(1\ 1)/2;\ or$$

$$P[x, 0]:=(V_F[x, -3]V_F[x,-1]V_F[x,1]V_F[x, 3])*(-1\ 9\ 9\ -1)/16;\ or$$

$$P[x, 0]:=(V_F[x, -5] \ldots V_F[x,5]*(3\ -25\ 150\ 150\ -25\ 3)/256;\ or$$

$$P[x, 0]:=(V_F[x, -7] \ldots V_F[x, 7])*(-5\ 49\ -245\ 1225\ 1225\ -245\ 49\ -5)/2048.$$

The above half band predictors are provided by way of example. It is understood that any half band predictor could be provided, or that the predicted field could be produced using other transforms or schemes, preferably those that offer a prediction of what the second field would be if there were no motion between fields, using the first field as a reference (or vice-versa).

The error field is then determined as the difference between the second field and the predicted field, such as according to the following equation:

$$E[x, 0]:=V_S[x, 0]-P[x, 0];\ (*error\ calculation*)$$

Finally, in a reverse prediction flow, the second field is reconstructed according to the following equation:

$$V_S[x, 0]:=E[x, 0]+P[x, 0];\ (*value\ reconstruction*)$$

The above equations correspond to the value in column x, row 0 in two dimensional geometrical space. Values in other rows and columns can be analyzed, according to the following generalized equations.

$$P[x, y]:=(V_F[x,y-1] \ldots V_F[x, y+1])*(1\ 1)/2\ (or\ alternate\ half\ band\ predictor);$$

$$E[x, y]:=V_S[x, y]-P[x, y]\ (*error\ calculation*)$$

$$V_S[x, y]:=E[x,y]+P[x,y]\ (*value\ reconstruction*)$$

Various alternatives for determining the prediction field, error field and other fields can be implemented. For example, in one alternative, the range of the math system can be maintained exactly. This means that n bit per pixel component images yield n bit full resolution results. Notably, when implementing this, the resulting transform must be recorded exactly to avoid wrapping errors, because an error of one can convert a value at one extreme of the range to the other extreme. The following equations can be used for this exact form alternative;

$$E[x, y]:=(V_S[x, y]-P[x, y]+Range)MOD\ Range;$$

$$V_S[x, y]:=(E[x, y]+P[x, y]+Range)MOD\ Range;$$

A scaled lossy form can also be implemented. This version maintains the range of the math system by dividing both the error field and the first field by 2, causing a 6 dB loss in resolution. If the math system has more resolution than desired in the image then this is fine. If the math system is the limit, then this process will reduce the available resolution by 6 dB. Exemplary scaled lossy equations are as follows:

$$E[x, y]:=(V_S[x, y]-P[x, y])/2;$$

$$V_F[x, y]:=V_F[x, y]/2;$$

$$V_S[x, y]:=(E[x, y])*2+P[x, y];$$

$$V_F[x, y]:=V_F[x, y]*2.$$

Finally, a non-linear lossy form can be implemented. For this alternative, the range of the math system is maintained by compounding the error into the original range, using nonlinear lookup and inverse lookup tables. The loss for common small values is 0 dB while the loss for much less frequent large values is about 12 dB. This approach can optimize resolution in a lossy environment.

$$E[x, y]:=LUT(V_S[x, y]-P[x, y]);$$

$$V_S[x, y]:=ILUT(E[x, y]+P[x, y]).$$

The interlaced image processing scheme offers substantial performance and efficiency advantages over conventional field and frame based processing. Images with significant motion can be encoded at about 50 to 70 percent of the size they would be if the image was processed as a frame, and typically with an advantage over field processing as well, whether due to correlation from still portions of the image, or low frequency correlation. Images with no motion can be encoded at within a few percent of the same size they would be if the image was processed as a frame, and with about a 30 percent advantage over field processing.

The interlaced image processing scheme is not limited to processing the first and second fields in an interlaced video stream as described in accordance with the preferred embodiment. For example, the interlaced image processing scheme can also be used to allow one channel to process two or more different signals. This is accomplished by accepting an interleaved stream and placing the data in different columns as it is processed. Table 2, below, illustrates the data allocation according to this alternative.

| Frame Line | Field | Original Date | Transformed Data | Field/Line in Phase |
|---|---|---|---|---|
| 1 | 1 | CB CR CB CR CB CR CB CR | CB CB CB CB CR CR CR CR | 1/1 |
| 2 | 2 | cb cr cb cr cb cr cb cr | CB CB CB CB CR CR CR CR | 1/3 |
| 3 | 1 | CB CR CB CR CB CR CB CR | CB CB CB CB CR CR CR CR | 1/5 |
| 4 | 2 | cb cr cb cr cb cr cb cr | eb eb eb eb er er er er | 2/2 |
| 5 | 1 | CB CR CB CR CB CR CB CR | eb eb eb eb er er er er | 2/4 |
| 6 | 2 | cb cr cb cr cb cr cb cr | eb eb eb eb er er er er | 2/6 |

In yet another alternative, the interlaced image processing scheme can be used to process Y Cb Cr in one channel. This is illustrated with reference to Table 3, below:

and line in phase. In the example, the 1s represent information in a first field, and the 2s the second. Line in phase indicates which original line the result is in phase with.

| Frame Line | Field | Original Data | Transformed Data | Field/Line in Phase |
|---|---|---|---|---|
| 1 | 1 | Y CB Y CR Y CB Y CR | Y Y Y Y CB CB CR CR | 1/1 |
| 2 | 2 | y cb y cr y cb y cr | Y Y Y Y CB CB CR CR | 1/3 |
| 3 | 1 | Y CB Y CR Y CB Y CR | Y Y Y Y CB CB CR CR | 1/5 |
| 4 | 2 | y cb y cr y cb y cr | ey ey ey ey eb eb er er | 2/2 |
| 5 | 1 | Y CB Y CR Y CB Y CR | ey ey ey ey eb eb er er | 2/4 |
| 6 | 2 | y cb y cr y cb y cr | ey ey ey ey eb eb er er | 2/6 |

Finally, similar rearrangements can be used for 4:2:2:4, 4:4:4 and 4:4:4:4 type image data. An additional benefit is that the same interlaced image processing module can be used to convert even fields to odd, and odd fields to even, for such applications as freeze field where the missing field of a frame needs to be generated.

Figure 6:
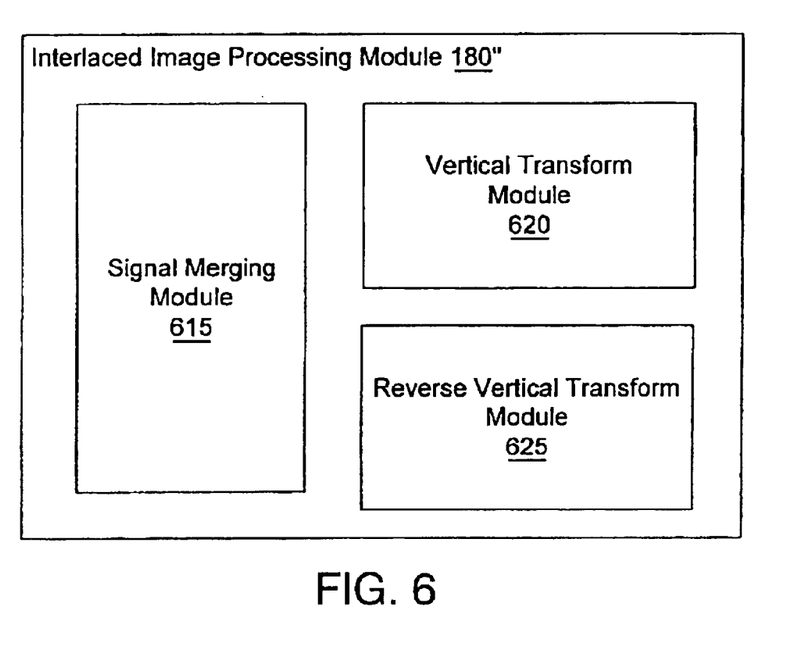
FIG. 6 is a schematic illustrating another embodiment of an interlaced image processing module constructed in accordance with the present invention.

Referring now to FIG. 6, another embodiment of an interlaced image processing module 180" includes a signal merging module 615, a vertical transform module 620 and a reverse vertical transform module 625. As with the previously described embodiment, this interlaced image processing module 180b receives frames comprising geometrically interlaced first and second fields, and produces two fields which are not interlaced in time. However, this interlaced image processing module 180b produces a predicted frame having a low frequency field and a high frequency field.

Figure 7:
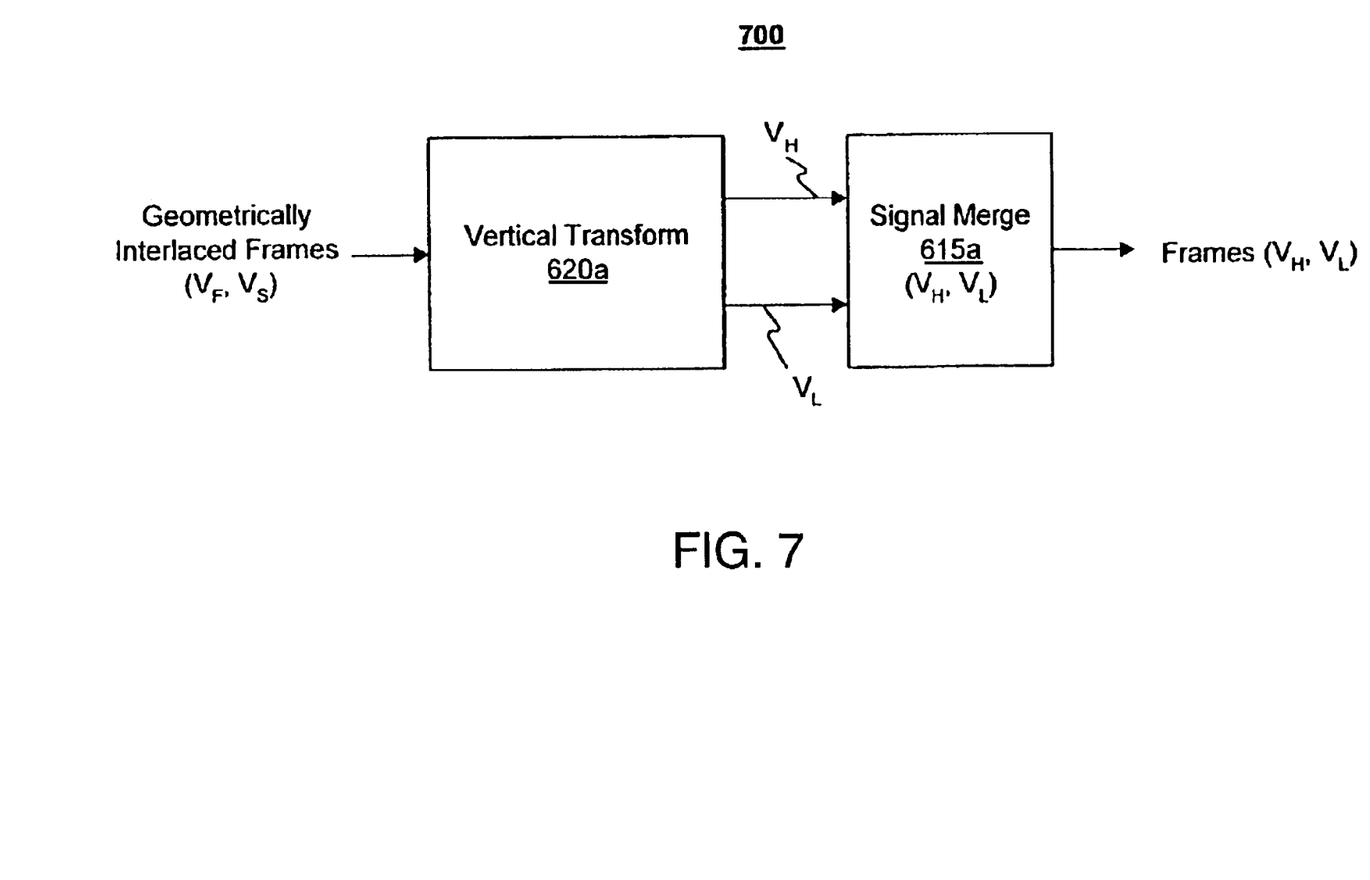
FIG. 7 is a flow diagram illustrating another embodiment of a method for forward processing of interlaced images in accordance with the present invention.

Referring now to the flow diagram of FIG. 7, an embodiment of a method for forward prediction 700 illustrates the operation of the interlaced image processing module 180b. Geometrically interlaced frames ($V_F$, $V_S$) are received by the vertical transform module 620a, which produces a low frequency field corresponding to both the first and second fields, and produces a high frequency field, also corresponding to both the first and second fields. Preferably, the vertical transform module 620a conducts a vertical transform of the interlaced frame before transformation, quantization, and encoding. A two dimensional transform can be employed at this stage as well but it is the vertical transform which addresses the interlaced image issues.

In the forward vertical transform, the resulting frame data is separated into a baseband region and a highband region, before the image is encoded. The signal merging module 615a receives the low and high frequency fields, and produces frames comprising them which are preferably not interlaced in time.

Provision of the vertical transform as such groups the lines together in time, which provides good motion correlation. Additionally, any and all auto-correlation in the frame resulting from still portions is taken advantage of through the reduced magnitude of the high band components. Further, the transform is undertaken as a continuous function with no discontinuous decisions, so it does not generate the potential discontinuous results of most block based interlaced systems.

Table 4 is an exemplary illustration of the results of the forward vertical transform. The table includes columns indicating the frame line, original data, transformed data,

TABLE 4

| Frame Line | Original Data | Transformed Data | Line In Phase |
|---|---|---|---|
| 1 | 1111111111111111 | LLLLLLLLLLLLLLLL | 1 |
| 2 | 2222222222222222 | LLLLLLLLLLLLLLLL | 3 |
| 3 | 1111111111111111 | LLLLLLLLLLLLLLLL | 5 |
| 4 | 2222222222222222 | HHHHHHHHHHHHHHHH | 2 |
| 5 | 1111111111111111 | HHHHHHHHHHHHHHHH | 4 |
| 6 | 2222222222222222 | HHHHHHHHHHHHHHHH | 6 |

Figure 8:
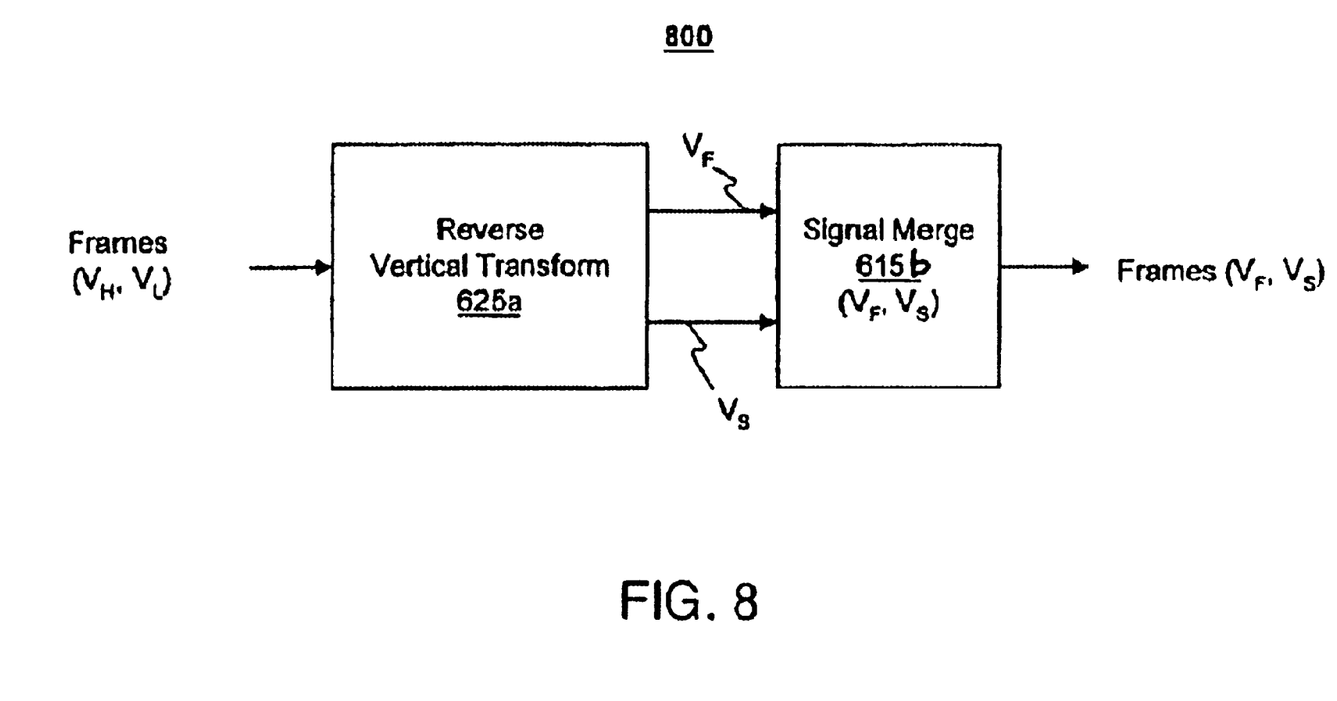
FIG. 8 is a flow diagram illustrating another embodiment of a method for reverse processing of interlaced images in accordance with the present invention.

Referring now to the flow diagram of FIG. 8, the reverse vertical transform module 625 receives the frame data comprising low and high frequency fields, and performs a reverse transform on the frame data to reproduce the first and second fields, which are merged 615b into conventional interlaced frames. Various conventional subband transforms can be implemented for the transform processes 620, 625a, including orthogonal and bi-orthogonal wavelets.

In contrast to such wavelet transform techniques, conventional motion image compression is based upon the Discrete Cosine Transform (DCT). The DCT relies for its efficiency upon a signal's "stationarity": a "stationary" signal has a consistent distribution of values over each dimension. Although clean motion image signals have a high degree of local stationarity in both space and time, images are globally very discontinuous. Increasing the DCT block size does not help to increase compression efficiency, if the processed image region is not stationary; and also produces a rapid increase in computational complexity. Thus, the typical DCT block size is 8 to 16 pixels square. Larger blocks lower efficiency, and increase the tendency to produce tiling artifacts in discontinuous regions. A three-dimensional DCT (the three dimensions being two spatial directions, plus time) also suffers from disadvantages, because the breakdown in image stationarity is typically even more extreme in time than in space; and because a three-dimensional DCT is computationally complex. Thus, motion estimation techniques, and other techniques whose drawbacks are described above, are typically used in DCT-based systems.

By contrast, wavelet-based compression systems attempt to optimize time/frequency resolution, to avoid the need for a stationary signal. Wavelet techniques are thus efficient full-image transforms, for a wide variety of image types and discontinuous mixtures. Full image transforms also avoid tiling artifacts, which result from discontinuous regions in images. Whereas, intuitively, a DCT-based system attempts to understand an image as a disassembled array of square puzzle pieces, a wavelet-based system attempts to understand an entire image. As the image size grows, wavelet-based approaches become progressively more efficient relative to DCT-based approaches. In particular, data requirements for DCT-based systems tend to grow at a rate that is roughly proportional to the size of the image, whereas wavelet-based systems can achieve rates which are roughly proportional to the information content of the image. Since information content typically grows as a lower order function than area, wavelet-based systems can achieve superior results.

There are a number of issues involved with processing interlaced video using wavelet-based compression systems. Interlaced video typically has fields with temporal offsets equal to one half of a frame, between fields; and spatial offsets equal to one half of the vertical line spacing, between lines on consecutive fields. Thus interlaced video has a temporal and spatial sample grid that results in the representation of diagonal frequency information in the temporal/vertical plane.

If temporally adjacent interlaced fields are geometrically shuffled together into frames, and processed in a spatial wavelet system, any motion creates phantom vertical frequency information at the vertical Nyquist frequency, which will greatly reduce coding efficiency if not addressed.

If, however, temporally adjacent interlaced fields are processed in a temporal wavelet system, any motion creates phantom vertical and temporal information at Nyquist frequencies. This phantom information will also degrade compression efficiency if not addressed.

Embodiments according to the invention solve these problems, by processing interlaced motion images using two-dimensional, nonseparable wavelet systems to decorrelate two types of information: first, the information that can be represented by the aligned sample grid; and second, the information that can be represented by the addition of the interlaced sample lines. Once these two components are orthogonally decorrelated, they can then be further processed by a spatial transform, or a spatial/temporal transform. Motion will no longer create artificial vertical frequencies at the vertical Nyquist frequency. Instead, the low component will represent a lower exposure rate representation of the image stream, and the diagonal component will represent the additional information required to double the combination of exposure rate and vertical resolution. If the sequence has no motion, then the diagonal component will represent only the additional vertical resolution, if any. In both cases, the goal is achieved of eliminating phantom information caused by motion, while maintaining efficient compression.

A first two-dimensional, wavelet-based embodiment according to the invention uses a two-dimensional, nonseparable, near orthogonal, odd-sized filter system, of 7-by-7 or 9-by-9 size. Such a filter is applied to each component of the image (in a similar fashion to that described below for biorthogonal wavelet filters), to implement the vertical transform described above. Larger filters tend to exhibit no improvement, or a decrease in efficiency. The odd size ensures that each component represents a view centered on its own frame-of-reference, which ensures a phase linear behavior under quantization (if the filter system is phase linear).

A second two-dimensional wavelet-based embodiment according to the invention uses a small, 3-by-3, two-dimensional biorthogonal filter, to implement the vertical transform described above. Relative to the first two-dimensional wavelet embodiment (of the previous paragraph), such a system has slightly lower efficiency, and a slightly worse distribution of quantization error over the frequency domain. An example of implementing such a two-dimensional biorthogonal filter is as follows. First, a $$\begin{matrix} 1 & & 1 \\ & 4 & & /8 \\ 1 & & 1 \end{matrix}$$

filter is applied to each component of the first field, to develop the low frequency component. This filter is applied by viewing the central element ("4") as being centered on the image component that is being transformed, and the elements above and below as corresponding to image components that are in the lines of the second field that are above and below the image component that is being transformed. Intuitively, the array of filter elements can be viewed as being placed on top of the interlaced array of image components. Then the filter elements are used as coefficients to multiply their corresponding image components; then the multiplied components are added; and, finally, the result is divided by the indicated divisor ("/8"). The result, then, is a "weighted average" of image components.

Next, a $$\begin{matrix} -1 & & -1 \\ & 4 & & /8 \\ -1 & & -1 \end{matrix}$$

filter is applied to each component of the second field in a similar fashion, to develop the high frequency component, thereby completing the forward vertical transform.

To implement the reverse vertical transform, thereby recovering the original fields, a $$\begin{matrix} 1 & & 1 \\ & 8 & & /4 \\ 1 & & 1 \end{matrix}$$

filter is applied to each component of the second field, to recover it; and then a $$\begin{matrix} -1 & & -1 \\ & 8 & & /4 \\ -1 & & -1 \end{matrix}$$

filter is applied to each component of the first field, to recover it. Other nonseparable, near orthogonal wavelets, and other biorthogonal wavelets, may be used in accordance with embodiments of the invention.

From a compression point of view, three-dimensional wavelet transforms are even better than two-dimensional transforms (the three dimensions being two spatial dimensions, plus time). Three-dimensional transforms support images that lack time stationarity, and do not introduce artifacts by errors in motion estimation, as frequently happens with DCT-type processes. Also, although three-dimensional wavelet transforms may introduce blurring at high compression ratios, the level of blurring is typically less than is encountered in a DCT-based system, and the blurring can be arranged to be exactly the same classes of blurring for which the human visual system naturally counters. However, three-dimensional wavelet transforms are more difficult to implement than two-dimensional transforms, and the above two-dimensional processes according to embodiments of the invention achieve efficiency without being as difficult to implement.

In accordance with further embodiments of the invention, similar wavelet-based techniques may be implemented, in spatial-only processes. In such embodiments, the method is reduced to a vertical wavelet separation of the two raster components. Both near orthogonal odd-sized filter systems, or small biorthogonal filter systems, may be used. For near orthogonal odd-sized filter systems, a filter of 9-tap size (i.e. four components on either side of the component of interest) appears to provide the best results. By comparison with the two-dimensional wavelet embodiments described above, the spatial-only processes have the advantage of supporting single-frame processing, and of conveniently processing either interlaced or progressive (non-interlaced) streams. Spatial-only processes have the disadvantage, relative to the two-dimensional wavelet embodiments, of having slightly lower efficiency, and have some phase linearity error under quantization. Biorthogonal, spatial-only processes have even lower efficiency, and a worse distribution of quantization error over the frequency domain.

In a further embodiment according to the invention, wavelet processing enables processing of motion images that are a mixture of interlaced and progressive (non-interlaced) video. First, even and odd interlaced fields are "shuffled" into one frame, with alternating lines being from the even and odd fields. Then a wavelet bandsplit is used to transform the video frames: a one-dimensional wavelet is run vertically through the combined image, to produce a high frequency and a low frequency field. For this purpose, advantageous wavelets are 9-tap (i.e. beyond four values on either side of the component of interest are zeroes); 7-tap, or Haar 2-tap near orthogonal wavelets. The resulting high frequency and low frequency fields can then be processed as a still image, with substantial motion being turned into a still difference. This technique eliminates non-linear convexity errors that occur with some types of compression. It also allows the mixture of interlaced and progressive video without loss of efficiency. This is particularly advantageous for adapting to present high-definition standards, which allow both interlaced and progressive format video.

Further information concerning the wavelet transform may be found in *Wavelet Transforms: Introduction to Theory and Applications,* by Raghuveer M. Rao and Ajit S. Bopardikar, Addison Wesley Longman, 1998; and in *A Wavelet Tour of Signal Processing, Second Edition,* by Stephane Mallat, Academic Press, 1998; the disclosure of both of which is hereby incorporated herein by reference.

Although the present invention has been described in detail with reference to certain embodiments thereof, other embodiments are possible. For example, the various modules, or functions within those modules can be provided as hardware in lieu of software. Additionally, the interlaced image processing module could provide frame data to external resources for further processing (e.g., transformation, quantization and encoding), or could receive frame data previously parsed into first and second fields, eliminating the need for preliminary signal parsing. Further, although certain equations are provided in two dimensional space, other configurations can be contemplated. Therefore, the spirit and scope of the claims should not be limited to the description of the embodiments contained herein.

What is claimed is:

1. A method for pre-processing, prior to compression thereof, a digital electronic video data stream having at least a portion thereof corresponding to successive frames of interlaced fields, the method comprising:
   receiving electronic frame video data corresponding to one of the frames of the video data stream; and
   applying a wavelet transform to the frame video data, without spatial partitioning thereof into blocks smaller than the frame video data, to obtain a frequency-partitioned data set comprising a plurality of frequency bands, so that relative motion of an imaged object in successive fields corresponding to the frame video data is effectively captured by virtue of the wavelet transform.

2. A method according to claim 1, wherein the wavelet transform is a three-dimensional wavelet transform.

3. A method according to claim 1, wherein the method comprises processing video data that is a mixture of interlaced and progressive format video.

4. A method for reverse processing of a digital electronic video data stream after the data stream has undergone decompression, the method comprising:
   identifying data within the digital electronic video data stream corresponding to a frequency-partitioned data set comprising a plurality of frequency bands;
   applying a reverse wavelet transform to the frequency-partitioned data set representing an image frame, without spatial partitioning thereof into blocks smaller than the frame video data, to obtain a plurality of neighboring fields of the image signal.

5. A method according to claim 4, wherein the reverse wavelet transform is a three-dimensional wavelet transform.

6. A method according to claim 4, wherein the method comprises reverse processing of a decompressed digital electronic video stream that is a mixture of interlaced and progressive format video.

7. A method for reverse processing of decompressed data corresponding to interlaced fields, the method comprising:
   receiving, for each frame of the video data stream, frame video data corresponding to low frequency image data and high frequency image data;
   applying a reverse wavelet transform to the frame video data from the entire frame including both the frame's low frequency image data and high frequency image data, without spatial partitioning thereof into blocks smaller than the frame video data, to obtain a first field for each frame, based on the frame's low frequency field and high frequency field;
   applying a reverse wavelet transform to the frame video data from the entire frame including both the frame's low frequency image data and high frequency image data, without spatial partitioning thereof into blocks smaller than the frame video data, to obtain a second field for each frame, based on the frame's low frequency field and high frequency field; and producing, for each frame, data comprising the frame's first field and second field, the first field and the second field being interlaced.

8. A method according to claim 7, in which the reverse wavelet transform is a two-dimensional wavelet transform.

9. A method according to claim 8, in which the reverse wavelet transform is a nonseparable, near orthogonal wavelet transform.

10. A method according to claim 9, in which the reverse wavelet transform is implemented as an odd-sized linear filter.

11. A method according to claim 8, in which the reverse wavelet transform is a biorthogonal wavelet transform.

12. A method according to claim 11, in which the reverse wavelet transform is a 3-by-3 linear filter.

13. A method according to claim 7, in which the reverse wavelet transform is a spatial-only wavelet transform.

14. A method according to claim 13, in which the reverse wavelet transform is a nonseparable, near orthogonal wavelet transform.

15. A method according to claim 13, in which the reverse wavelet transform is a biorthogonal wavelet transform.

16. A method according to claim 7, in which the method comprises processing a video data stream that is a mixture of interlaced and progressive format video.

17. An apparatus for reverse processing of decompressed data corresponding to interlaced fields, the apparatus comprising:

an input for receiving, for each frame of the video data stream, frame video data corresponding to a low frequency band and a high frequency band;

a reverse wavelet transform module, in communication with the input, for obtaining, using a reverse wavelet transform applied to the frame video data from the entire frame, without spatial partitioning thereof into blocks smaller than the frame video data, a first field for each frame based on the frame's low frequency band and high frequency band;

the reverse wavelet transform module, in communication with the input, for obtaining, using a reverse wavelet transform applied to the frame video data from the entire frame, without spatial partitioning thereof into blocks smaller than the frame video data, a second field for each frame based on the frame's low frequency band and high frequency band; and a signal merging module, in communication with the reverse wavelet transform module, for producing, for each frame, data comprising the frame's first field and second field, the first field and the second field being interlaced.

18. An apparatus according to claim 17, in which the reverse wavelet transform module implements a two-dimensional wavelet transform.

19. An apparatus according to claim 18, in which the reverse wavelet transform module implements a nonseparable, near orthogonal wavelet transform.

20. An apparatus according to claim 19, in which the reverse wavelet transform module implements an odd-sized linear filter.

21. An apparatus according to claim 18, in which the reverse wavelet transform module implements a biorthogonal wavelet transform.

22. An apparatus according to claim 21, in which the reverse wavelet transform module implements a 3-by-3 linear filter.

23. An apparatus according to claim 17, in which the reverse wavelet transform module implements a spatial-only wavelet transform.

24. An apparatus according to claim 23, in which the reverse wavelet transform module implements a nonseparable, near orthogonal wavelet transform.

25. An apparatus according to claim 23, in which the reverse wavelet transform implements a biorthogonal wavelet transform.

26. An apparatus for reverse processing of a decompressed data corresponding to interlaced fields, the apparatus comprising:

means for receiving, for each frame of the video data stream, frame video data corresponding to a low frequency band and a high frequency band;

means for obtaining, using a reverse wavelet transform applied to the frame video data from the entire frame, without spatial partitioning thereof into blocks smaller than the frame video data, a first field for each frame based on the frame's low frequency band and high frequency band;

means for obtaining, using a reverse wavelet transform applied to the frame video data from the entire frame, without spatial partitioning thereof into blocks smaller than the frame video data, a second field for each frame based on the frame's low frequency band and high frequency band; and means for producing, for each frame, data comprising the frame's first field and second field, the first field and the second field being interlaced.

27. An apparatus according to claim 26, in which the means for obtaining a first field and the means for obtaining a second field comprise means for performing a two-dimensional wavelet transform.

28. An apparatus according to claim 27, in which the two-dimensional wavelet transform means comprises means for performing a nonseparable, near orthogonal wavelet transform.

29. An apparatus according to claim 28, in which the nonseparable wavelet transform means comprises an odd-sized linear filter.

30. An apparatus according to claim 27, in which the two-dimensional wavelet transform means comprises means for performing a biorthogonal wavelet transform.

31. An apparatus according to claim 30, in which the biorthogonal wavelet transform means comprises a 3-by-3 linear filter.

32. An apparatus according to claim 26, in which the means for obtaining a first field and the means for obtaining a second field comprise means for performing a spatial-only wavelet transform.

33. An apparatus according to claim 32, in which the spatial-only wavelet transform means comprises means for performing a nonseparable, near orthogonal wavelet transform.

34. An apparatus according to claim 32, in which the spatial-only wavelet transform means comprises means for performing a biorthogonal wavelet transform.

35. The method according to claim 1, further comprising compressing the video data stream by:
   performing a wavelet transform on each of the frequency bands;
   quantizing the resulting wavelet transformed frequency bands; and
   entropy encoding the quantized information.

36. The method according to claim 4, further comprising decompressing the video data stream by:
   entropy decoding the compressed image signal;
   performing an inverse quantization on the entropy decoded image signal; and
   performing a reverse wavelet transform on the image signal.

37. A method according to claim 1 wherein the motion does not create artificial vertical frequencies at the vertical Nyquist frequency.

38. A method according to claim 4 wherein there is relative motion of an imaged object in successive fields corresponding to the frame video data and the motion does not create artificial vertical frequencies at the vertical Nyquist frequency.

39. A method according to claim 7 wherein there is relative motion of an imaged object in successive fields corresponding to the frame video data and the motion does not create artificial vertical frequencies at the vertical Nyquist frequency.

40. An apparatus as in claim 17 wherein there is relative motion of an imaged object in successive fields corresponding to the frame video data and the motion does not create artificial vertical frequencies at the vertical Nyquist frequency.

41. An apparatus as in claim 26 wherein there is relative motion of an imaged object in successive fields corresponding to the frame video data and the motion does not create artificial vertical frequencies at the vertical Nyquist frequency.

* * * * *